United States Patent [19]
Cole

[11] 4,251,718
[45] Feb. 17, 1981

[54] HEATING CIRCUITS

[75] Inventor: Graham M. Cole, Lymington, England

[73] Assignee: Dreamland Electrical Appliances Limited, Southampton, England

[21] Appl. No.: 971,918

[22] Filed: Dec. 19, 1978

[30] Foreign Application Priority Data

Jan. 31, 1978 [GB] United Kingdom ............. 3867/78

[51] Int. Cl.³ .............................................. H05B 1/02
[52] U.S. Cl. .................................. 219/501; 219/483; 219/505; 219/511; 219/212
[58] Field of Search ............... 219/501, 511, 505, 486, 219/508, 483, 494, 509, 212, 519; 338/26

[56] References Cited
U.S. PATENT DOCUMENTS

| | | | |
|---|---|---|---|
| 3,375,477 | 3/1968 | Kawazoe | 219/505 |
| 3,462,585 | 8/1969 | Somess | 219/501 |
| 3,549,865 | 12/1970 | Melling | 219/505 |
| 3,564,203 | 2/1971 | Naoi | 219/501 |
| 3,699,308 | 10/1972 | Hutchinson et al. | 219/501 |
| 3,943,326 | 3/1976 | Henry | 219/501 |
| 4,085,309 | 4/1978 | Godel | 219/501 |

Primary Examiner—Bruce A. Reynolds
Assistant Examiner—M. H. Paschall
Attorney, Agent, or Firm—Mason, Fenwick & Lawrence

[57] ABSTRACT

A heating circuit, in particular for electric blankets or pads, comprises a first, heating conductor and a second conductor separated by a material which has an impedance that falls with increasing temperature and/or which will melt in the event of overheating to allow contact between the two conductors. A half-wave rectifier and a thermally-operative circuit interruption means are connected in series with the heating conductor across an AC supply. A resistor is electrically connected to the second conductor such that the resistance and the impedance of said material are connected in series across the supply. The resistor is thermally coupled to the circuit interruption means whereby, in the event of overheating of said material, the drop in the impedance of the material to a reduced or zero value will cause the current through the resistor to increase to heat the resistor, which causes the circuit interruption means to disconnect the circuit from the supply.

28 Claims, 9 Drawing Figures

HEATING CIRCUITS

BACKGROUND OF THE INVENTION

1. Field of the Invention

This invention relates to heating circuits, particularly (but not exclusively) for electric blankets or pads.

2. Description of the Prior Art

It is known to incorporate in an electric blanket a cable comprising a heating conductor, a sensor conductor and separating means that separates the two conductors and which has an impedance that falls with increasing temperature and/or which will melt in the event of overheating to allow contact between the two conductors. (See U.S. Pat. No. 2,831,099 to Crowley and UK Pat. No. 1,155,118 issued to the assignees hereof.) An AC power supply is connected across the heating conductor to heat it. Means is provided responsive to the impedance of the separating means dropping to a value indicating overheating of the cable (which value will be zero in the event of melting resulting in contact of the conductors) to prevent current flowing through the heating conductor. A disadvantage of such an arrangement is that the reliable detection of overheating becomes difficult due to the voltage gradient occurring along the heating conductor due to the fact that the supply voltage is applied across its ends. While this does not create a problem if the overheating is general, i.e., if it is present along the whole length of the cable, a difficulty arises if the overheating is localised at a position along the length of the cable, because the voltage at the position where the two conductors are connected by the reduced or zero impedance will be anywhere between the full supply voltage and zero, depending on the location of the position.

Known attempts to overcome this disadvantage—see the above-mentioned U.S. Pat. No. 2,831,099 and also UK Pat. No. 793,783—have involved the use of complex and thus unreliable circuit arrangements.

A primary object of the present invention is to overcome the above-mentioned disadvantage of the prior art.

Another object of the invention is to overcome the above-mentioned disadvantage of the prior art by enabling the reliable detection of both localised and general overheating in a simple manner, without the need for complex circuit arrangements and/or an additional sensor conductor.

A further object of the invention is to reliably detect overheating resulting in short-circuiting between a cable incorporating the two conductors in a manner which will avoid disintegration of the cable at the location of the short circuit.

Yet another object of the invention is to provide a heating circuit which reliably detects overheating, both localised and general, which is of simple construction, and which provides a selective multiheat output, preferably with two heating conductors only.

SUMMARY OF THE INVENTION

According to the invention a heating circuit comprises input terminals for connection to an AC supply, a first elongate conductor to effect heating, half-wave rectifier means, and thermally-operative circuit interruption means. The first conductor, rectifier means and circuit interruption means are connected in series between the input terminals. The heating circuit further comprises a second elongate conductor substantially coextensive with the first conductor, separating means which separates the two conductors and which has an impedance that falls with increasing temperature and/or which will melt in the event of overheating to allow contact between the two conductors, and a resistor that is electrically connected in series between the input terminals, the resistor being thermally coupled to the circuit interruption means whereby in the event of overheating of the separating means said impedance will drop so that the current through the resistor will increase to heat the resistor to cause the circuit interruption means to disconnect the circuit from the supply.

Due to the provision of the half-wave rectifier means, current does not flow through the heating conductor during alternate half-cycles of the AC supply voltage. Consequently, during such half-cycles the heating conductor is at a uniform potential along its length whereby, in the event of a localised overheat, the increased magnitude of the current flowing through the resistor will be substantially independent of the location of the overheat. Thus, the mean current flowing through the resistor in the event of a localised overheat will exceed a minimum value sufficient to cause disconnection of the circuit from the supply, regardless of the location of the overheat. The invention thus enables reliable detection of both localised and general overheating in a very simple manner, without the need for complex circuitry and/or an additional sensor conductor.

The first and second conductors and the separating means preferably constitute parts of a heating cable. In a so-called 'crowbar' system in which a short circuit between the two conductors produces a virtual short circuit across the AC supply input terminals, the cable often disintegrates in the event of a short circuit. This is because the short circuit is often lossy, particularly after a long period due to oxidisation or the like of the conductors, whereby a large amount of power is dissipated across the short circuit. The fact that, in a circuit in accordance with the invention, the said resistor (which is typically around 10K in value) is in series with the impedance of the separating means results in the possibility of cable disintegration being greatly reduced or eliminated, since the resistor is in series with any short circuit and limits the current flowing to a value which, while sufficient to cause operation of the circuit interruption means, is several orders of magnitude less than in a crowbar system whereby the dissipation at the site of the short circuit is minimal.

The invention also enables a variable heat output to be provided if both conductors are heating conductors and if switch means is provided to enable the two heating conductors to be selectively connected to the supply in different manners. For instance, the two conductors may have different power outputs and the switch means may be arranged so that either one of the conductors may be arranged in series with the half-wave rectifier means and the circuit interruption means and therefore have heating current pass through it, the other one of the conductors in each case constituting the second conductor of the invention and not having heating current flow through it. Additionally or alternatively, the switch means may be arranged so that the two heating conductors may be connected in series and/or in parallel so that heating current flows through both, the overheat protection facility being maintained.

Thus, with the above variable heat output facility there can be provided a heating circuit of simple construction having two heating conductors only and having both overheat protection and a selective multiheat output. Thus if, as is preferred, the two conductors and temperature sensitive means are embodied as a unitary heating cable, a simple and versatile heating circuit is provided.

In an alternative embodiment, a variable heat output facility can be provided by employing switch means and a further pair of conductors separated by separating means.

Heating circuits in accordance with the invention are applicable to the heating of a variety of objects or media. They may be used, for example, in pipe heating, soil warming, industrial process heating or in space heating, for instance in ceiling heating or under-floor heating. The invention is, however, especially suited to the heating of an electric blanket, which term is to be deemed to encompass not only electrically heated overblankets and electrically heated underblankets, but also electrically-heated pads.

BRIEF DESCRIPTION OF THE DRAWINGS

Other objects, features and advantages of the invention will become apparent from the following description of exemplary and non-limitative embodiments of the invention illustrated in the accompanying drawings, in which.

Throughout the figures of the drawings, like reference numerals indicate like items.

DETAILED DESCRIPTION OF THE PREFERRED EMBODIMENTS

Figure 1:
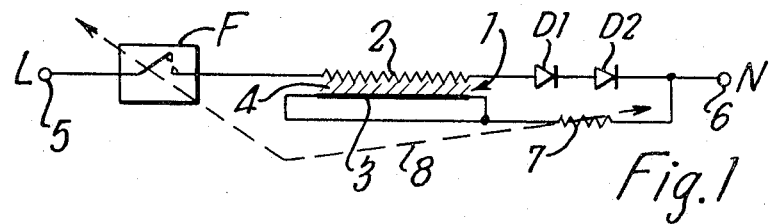
FIG. 1 is a circuit diagram of a heating circuit embodying the invention.

The heating circuit shown in FIG. 1 comprises a cable 1 which is, for example, incorporated in an electric blanket or pad in a manner known in the art. The cable 1 comprises a heating conductor 2 and a sensor conductor 3 separated by a material 4 shown in the drawing by cross-hatching. The heating conductor 2 is of resistance wire and is therefore represented as a resistor. The sensor conductor 3 does not, in this embodiment of the invention, carry heating current, and can therefore be a low resistance conductor, for example of copper. The cable 1 is preferably so constructed that the conductors 2 and 3 are coaxial: the heating conductor 2 is the inner one of the conductors and is wound on an electrically insulative core, the material 4 surrounds the conductor 2, the conductor 3 is wrapped or wound around the material 4, and an outer sheath covers the sensor conductor 3. The material 4 is of such a nature that its impedance falls with an increase in temperature, preferably logarithmically. A suitable material is polyvinyl chloride (PVC). The PVC may, as is known in the art, be doped with a material that increases its conductivity, but it is preferred that undoped PVC be used. The cable 1 may in fact be constructed along the lines described in UK Pat. Nos. 746,017 and 841,604.

The heating conductor 2 is connected in series with a thermal fuse F and a pair of diodes D1, D2 between a pair of input terminals 5, 6 for connection to the live (L) and neutral (N) conductors of an AC power supply (not shown), the thermal fuse (F) being adjacent the live terminal 5 and the diodes D1 and D2 being adjacent the neutral terminal 6. As is known to those skilled in the art, the thermal fuse F is a non-resettable thermal link and comprises a current carrying device (generally incorporating a low melting point alloy) responsive to the application of external heat to non-resettably stop the passage of current therethrough.

A resistor 7 is connected at one end to the neutral input terminal 6 and at its other end to the right hand end of the sensor conductor 3 as viewed in the drawing, whereby the impedance of the material 4 and the resistor 7 are connected in series between the input terminals 5 and 6. The resistor 7 is thermally coupled to the thermal fuse F, as represented by a dotted line 8, whereby the generation of a predetermined amount of heat by virtue of sufficient current flowing through the resistor 7 will cause the fuse to blow.

The ends of the sensor conductor 3 are, as shown, connected together.

The above-described heating circuit operates in the following manner. When the terminals 5, 6 are connected to the AC power supply, current flows through the heating conductor 2 and warms the blanket or pad. Due to the presence of the diodes D1 and D2, the heating current only flows during positive half-cycles of the supply voltage, that is to say during those half-cycles during which the live input terminal 5 is positive with respect to the neutral input terminal 6. Accordingly, during positive half-cycles the heating current establishes a voltage gradient along the heating conductor 2, the voltage varying between a maximum value at its left hand end as viewed in the drawing to substantially zero at its right hand end. During negative half-cycles, since heating current does not flow the heating conductor 2 will be at a uniform potential along its length.

Current also flows between the input terminals 5 and 6 via the series combination of the resistor 7 and the impedance of the undoped PVC material 4. Under normal conditions the PVC material 4 is a good insulator whereby the current is small. Accordingly, little heat is generated by the resistor 7 and the thermal fuse 4 is unaffected by such heat. As the cable 1 warms up, the impedance of the PVC material 4 drops logarithmically so that the current flowing therethrough and through the resistor 7 increases. However, the circuit is so designed that at all normal operating temperatures the current through the resistor 7 is insufficient to cause enough heat to be generated to actuate the thermal fuse F. Suppose, however, that general overheating of the cable 1 occurs, that is to say that the PVC material is heated along the length of the cable to a temperature approaching its melting point, which is about 160° C. The logarithmic impedance/temperature characteristic of the PVC material 4 is such that above about 140° C. there is a very large drop in the impedance, that is to say the material stops behaving as a good insulator. Accordingly, the current flowing through the impedance of the PVC material 4 and the resistor 7 becomes of an appreciable magnitude when the temperature of the material 4 is in the vicinity of its melting point, namely in a range of temperatures of about 140° to 160° C. The circuit is so designed that when the temperature of the material 4 reaches a value in this range the current through the resistor 7 is of a high enough value to heat the resistor sufficiently to cause the thermal fuse F to blow and therefore disconnect the heating circuit from the AC power supply.

Suppose now that instead of the cable 1 being overheated along its whole length, it becomes overheated at a localised position along its length, for example due to a ruck in the blanket or pad, a twisting or looping of the cable, or bunching of the wires of the cable. During positive half-cycles of the supply voltage, due to the voltage gradient along the heating conductor 2 the current that flows through the locally reduced impedance of the material 4 and the resistor 7 will vary between a maximum value if the overheat is at the left hand end of the cable 1 to substantially zero if the overheat is at the right hand end of the cable 1. However, during negative half-cycles, since the voltage along the heating conductor 2 is uniform the value of the current flowing through the resistor 7 will be the same wherever along the length of the cable 1 the overheat is situated. The circuit is so designed that in the event of such a local overheat the mean current flowing through the resistor 7 caused by the current flow during negative half-cycles is sufficient to cause blowing of the thermal fuse F. Accordingly, protection against both general and localised overheating is provided, the circuit being isolated from the supply if the material 4 attains a temperature of 160° C. or lower, whereby combustion cannot occur.

In some instances it is possible that in the event of an overheat the PVC material might melt whereby the outer sensor conductor 3 will collapse onto the inner heating conductor 2. The resultant short circuit is equivalent to the impedance of the material 4 dropping to zero, whereby the current flowing through the resistor 7 will be ample to blow the thermal fuse F. In fact, if such an abrupt drop in the impedance occasioned by melting is deemed sufficient for signalling localised overheating, one can employ for the material 4 a substance that has an impedance that does not vary substantially with temperature below its melting point, for example polyethylene.

FIGS. 2 to 5 show a modified heating circuit which is the same as that described with reference to FIG. 1 except that switch means 9 and two further diodes D3 and D4 are provided, and the sensor conductor (designated 3′) is constructed of resistance wire to constitute a heating conductor. The switch means 9 is operative to enable the circuit to be selectively switched into any one of the four configurations shown in FIGS. 2 to 5, respectively. The way in which the switch means 9 can be wired to the various parts of the circuit to effect the various configurations will be evident to the man skilled in the art and is not shown in FIGS. 2 to 5 in order that they will be readily comprehensible.

Figure 2:
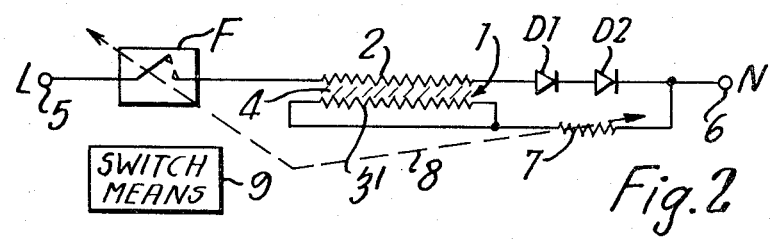
FIGS. 2 to 5 are circuit diagrams of a heating circuit which is a modification of that shown in FIG. 1, the different figures showing the circuit switched into four respective different configurations.

The conductor 2 is, for example, an 80 W conductor, that is to say it is of such a resistance that when it is connected as shown in FIG. 2 and a predetermined AC supply voltage is applied between the input terminals 5 and 6, the conductor will dissipate 80 W. The conductor 3 is, for example, a 40 W conductor.

The configuration shown in FIG. 2 is the same as that shown in FIG. 1. That is to say, heating current flows through the conductor 2 whereby the circuit provides 80 W of heating. The conductor 3′ acts as a sensor conductor in the same way as the conductor 3 of FIG. 1 and heating current does not flow through it.

Figure 3:
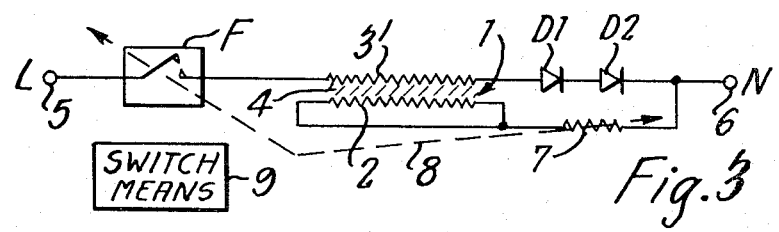

The configuration of FIG. 3 is the same as that shown in FIG. 2, except that the positions of the conductors 2 and 3′ are reversed so that the conductor 2 acts as the sensor conductor and heating current flows through the conductor 3′ whereby the circuit provides 40 W of heating.

Figure 4:
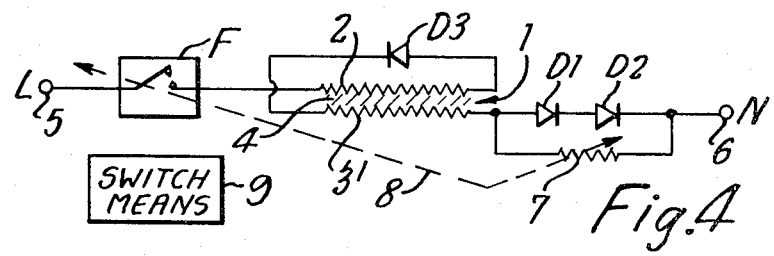

The configuration of FIG. 4 is the same as that shown in FIG. 2, except as follows. The conductors 2 and 3 are connected in series, with the diode D3 in series between them, so that heating current flows through the two conductors in series during positive half-cycles and the circuit therefore provides 25 W of heating. The connection together of the ends of the conductor 3′ is, of course, removed, and the anode of the diode is connected to the conductor 3′ rather than to the conductor 2. Note that, whereas the conductor 3′ carries heating current, the impedance of the material 4 is still connected in series with the resistor 7 between the input terminals 5 and 6 and that the conductors 2 and 3′ are at respective uniform potentials during negative half-cycles (the conductor 2 at live potential and the conductor 3′ at neutral potential), whereby the overheat protection feature as described above with reference to FIG. 1 continues to be provided. The resistor 7 will not be undesirably heated in normal operation during positive half-cycles of the supply voltage by virtue of its connection to the series heating current flow path, since the diodes D1, D2 clamp the voltage across it to a low value. Neither will undesirable heating of the resistor 7 occur in normal operation during negative half-cycles of the supply voltage, since the diode D3 prevents current flowing through the series circuit constituted by the resistor 7, the conductor 3′ and the conductor 2. In this connection, however, it is to be noted that short-circuit failure of the diode D3 would cause the heating circuit to fail safe, since in this eventuality current would in fact flow through the series circuit just-mentioned during negative half-cycles whereby the resistor 7 would generate heat and blow the thermal fuse F.

Figure 5:
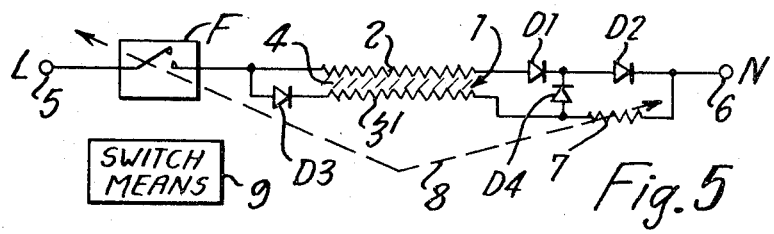

The configuration of FIG. 5 is the same as that shown in FIG. 2, except as follows. The connection between the ends of the conductor 3′ is removed and the left hand end of the conductor 3′ as viewed in the drawing is connected via the diode D3 to the corresponding end of the conductor 2 whereby the conductors 2 and 3′ are connected in parallel between the input terminals 5, 6 so that heating current flows through the two conductors in parallel during positive half-cycles and, therefore, 120 W of heating is provided. The diode D4 is connected in circuit as shown. Note that, whereas the conductor 3′ carries heating current, the impedance of the material 4 is still connected in series with the resistor 7 between the input terminals 5 and 6 and that the conductors 2 and 3′ are at respective uniform potentials during negative half-cycles (the conductor 2 at live potential and the conductor 3′ at neutral potential), whereby the overheat protection feature as described above with reference to FIG. 1 continues to be provided. The resistor 7 will not be undesirably heated in normal operation during positive half-cycles of the supply voltage, since current flowing between the input terminals 5 and 6 via the conductor 3′ reaches the terminal 6 via the diodes D4 and D2 so that the diodes D4 and D2 clamp the voltage across the resistor 7 to a low value. Neither will the resistor 7 be undesirably heated during negative half-cycles, since the diodes D3 and D1 prevent current flow via the resistor 7 in the negative direction. Note, however, that short-circuit failure of the diode D1 or the diode D3 would cause the blanket to fail safe, since in this eventuality current would flow through the resistor 7 and the conductor 3' or 2, respectively, during negative half-cycles whereby the resistor 7 would generate heat and blow the thermal fuse F.

The diode D4 is not essential to the operation of the circuit configuration of FIG. 4 and could be shorted out, that is to say replaced by a conductive connection. However, omission of the diode D4 would reduce the reliability of the circuit in this configuration since, in this event, a short circuit failure of the diode D2 would short-circuit the resistor 7 whereby heating would continue but the overheat protection facility would no longer be provided. The presence of the diode D4 ensures that, as explained above, the blanket fails safe in the event of short-circuit failure of either of the diodes D1 and D3, and that in the event of short-circuit failure of either of the diodes D2 and D4 the circuit would continue to operate with the overheat protection facility maintained.

Thus, it will be appreciated that the circuit of FIGS. 2 to 5, while being of simple construction and in particular comprising only a single dual coaxial heating cable, provides protection against overheating and enables four different heat settings to be selected, the overheat protection being maintained irrespective of the heat setting.

FIGS. 6 to 9 show another modified heating circuit which is the same as that described with reference to FIG. 1 except that switch means 9' and a further cable 1'' are provided.

The switch means 9' is operative to enable the circuit to be selectively switched into any one of the four configurations shown in FIGS. 6 to 9, respectively. The way in which the switch means 9' can be wired to the various parts of the circuit to effect the various configurations will be evident to the man skilled in the art and is not shown in FIGS. 6 to 9 in order that they will be more readily comprehensible.

The cable 1'' is substantially the same as the cable 1 and comprises a heating conductor 2'', a sensor conductor 3'' and a separating material 4'' (e.g. of PVC or polyethylene) which correspond to the conductors 2 and 3 and the material 4, respectively, of the cable 1. However, the heating conductors 2 and 2'' have different heat outputs, for example 80 W and 40 W, respectively.

Figure 6:
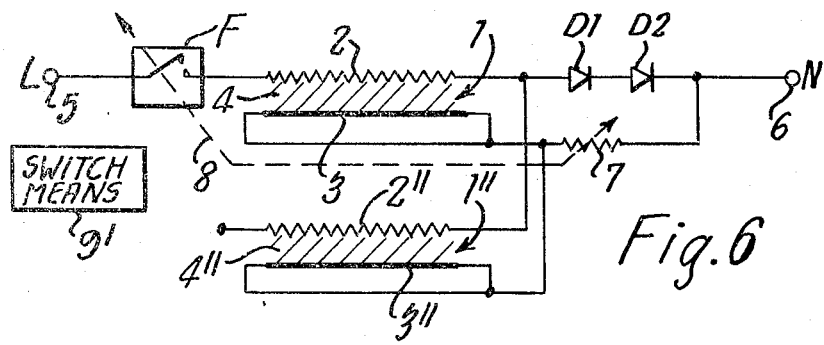
FIGS. 6 to 9 are circuit diagrams of a heating circuit which is another modification of that shown in FIG. 1, the different figures showing the circuit switched into four respective different configurations.

In the configuration of FIG. 6, only the cable 1 is in circuit. The circuit therefore behaves identically to that of FIG. 1 and 80 W of heating is provided.

Figure 7:
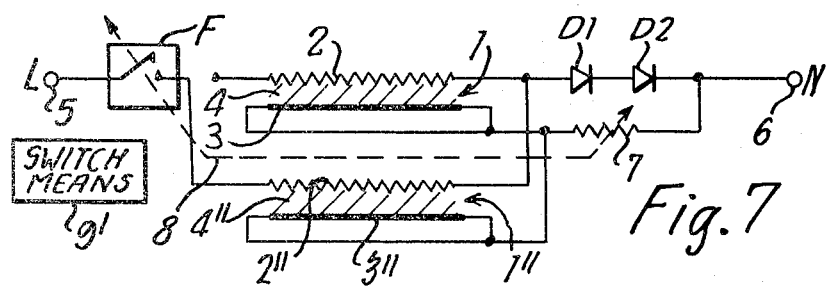

In the configuration of FIG. 7, only the cable 1'' is in circuit. The circuit therefore behaves identically to that of FIG. 1 and 40 W of heating is provided.

Figure 8:
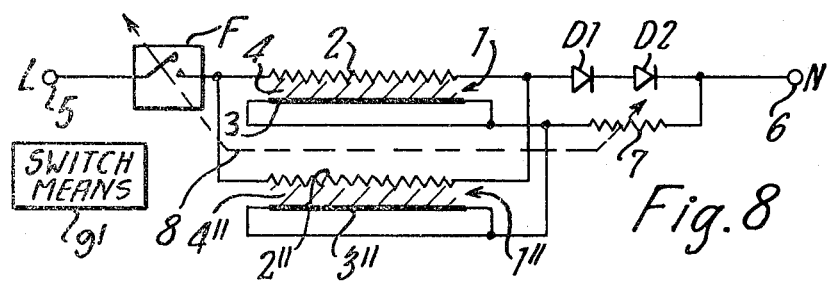

In the configuration of FIG. 8 the cables 1, 1'' are paralleled so that the heating conductors 2, 2'' are in parallel whereby 120 W of heating is provided. In this case, the impedance of each of the materials 4, 4'' is connected in series with the resistor 7 between the terminals 5, 6, that is to say the impedances of the materials 4, 4'' are in parallel. As will be evident, overheating of either of the cables 1, 1'' will cause the current through the resistor 7 to increase to blow the thermal fuse F, in the same way as in the circuit of FIG. 1.

Figure 9:
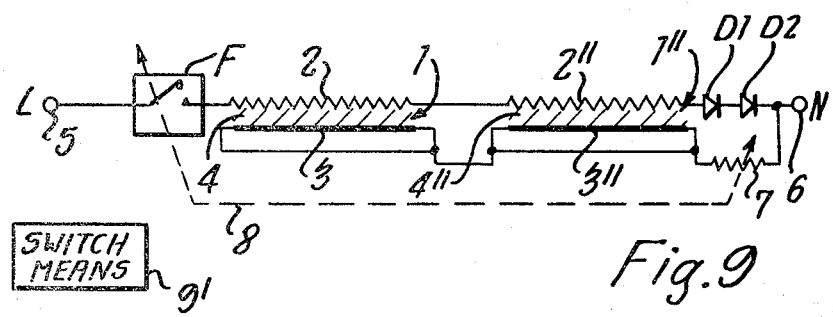

In the configuration of FIG. 9 the cables 1, 1'' are connected in tandem so that the heating conductors 2, 2'' are in series, whereby 25 W of heating is provided, and the sensor conductors 3, 3'' are connected together. As in FIG. 7, the impedance of each of the materials 4, 4'' is connected in series with the resistor 7 between the terminals 5, 6, that is to say the impedances of the materials 4, 4'' are in parallel, and, as before, overheating of either of the cables F will cause heating of the resistor 7 and blowing of the thermal fuse.

The circuits described above can be modified within the scope of the invention, for example in the various ways that will now be described.

In the circuit of FIG. 1 and in the circuit configurations of FIGS. 2, 3 and 6 to 9 the ends of the conductor or conductors 3, 3' or 3'' need not be connected together. However, connection together of the ends is preferred, since this ensures that overheat protection continues to be provided, as described, in the event of a single break in the conductor or conductors 3, 3' or 3''.

Instead of employing the two series-connected diodes D1 and D2, a single diode could be used. However, it is preferred to use two or more series-connected diodes since a short-circuit failure of any one of them would not adversely affect the operation of the circuit in any respect, whereas a short-circuit failure of a single diode would double the heat output of the circuit, due to the absence of rectification.

It is not essential that the half-wave rectifier means be one or more diodes. It could instead be some form of controlled half-wave rectifier means, for instance a thyristor, whereby the heat output of the blanket could be made continuously variable and/or subject to control by ambient temperature. Such a modified form of the circuit of the invention would suit the circuit to use in an all-night electric underblanket or overblanket. In this connection, it is pointed out that in the absence of some form of normal temperature control means the illustrated circuits are best suited to use in pre-heating electric underblankets, electric pads and the like.

The illustrated heating circuits could be modified by replacing the diode D2 with a semiconductor switch, for example a thyristor, whereby the heat output of the blanket could be continuously varied. if an ambient-temperature responsive element were included in a control circuit for the switch, the heating circuit would be suited for use in an all-night blanket. Further, the use of a semiconductor switch would enable the heating current to be shut off very quickly in the event of an arc due to a break in a heating conductor causing the insulation to fail between the two conductors of the cable. Such an arrangement would therefore offer not only protection against localised and general overheating, but also provide arc protection and a continuously variable heat output setting facility.

I claim:

1. In a heating circuit comprising input terminals for connection to an AC supply, a first elongate conductor to effect heating, thermally-operative circuit interruption means, the first conductor and circuit interruption means being connected in series between the input terminals, a second elongate conductor substantially coextensive with the first conductor, separating means which separates the two conductors and which has an impedance that falls with increasing temperature, and a resistor that is thermally coupled to the circuit interruption means, the improvement comprising means electrically connecting said resistor between the second conductor and one of said input terminals such that the resistor and said impedance are connected in series between the input terminals, and half-wave rectifier means connected in series with the first conductor and the circuit interruption means between the first conductor and said one input terminal so that during those half-cycles of the AC supply during which the rectifier means does not conduct the second and first conductors are at the potentials of said one input terminal and the other input terminal, respectively, whereby in the event of general overheating of the separating means or localised overheating of the separating means anywhere along its length the consequent general or localised drop in said impedance will cause the current through the resistor to increase by an amount that will heat the resistor by an amount sufficient to cause the circuit interruption means to disconnect the circuit from the supply.

2. A heating circuit according to claim 1, wherein the separating means comprises polyvinyl chloride.

3. A heating circuit according to claim 1, wherein the ends of the second conductor are connected together.

4. A heating circuit according to claim 1, wherein the thermally-operative circuit interruption means is a thermal fuse.

5. A heating circuit according to claim 1, wherein said first and second conductors comprise respective conductors of a unitary heating cable and are each heating conductors having respective different heat outputs, the circuit further comprising switch means enabling the circuit to be switched into different configurations whereby different heat outputs can be obtained from the cable.

6. A heating circuit according to claim 5, wherein the switch means is capable of switching the circuit into two configurations in each of which a respective one of the cable conductors constitutes said first conductor and the other one of the cable conductors constitutes said second conductor, each of said two configurations being such that heating current flowing, in use, between the input terminals passes through said first conductor only.

7. A heating circuit according to claim 5, wherein a further half-wave rectifier means is provided and the switch means is capable of switching the circuit into a configuration in which the first and second conductors are connected in series with the further half-wave rectifier means in series between them and poled in the same direction as the first-mentioned half-wave rectifier means whereby heating current flowing, in use, between the input terminals passes through both conductors in series.

8. A heating circuit according to claim 5, wherein another half-wave rectifier means is provided and the switch means is capable of switching the circuit into a configuration in which the first and second conductors are connected in parallel with one another with said other half-wave rectifier means in series with the second conductor and poled in the same direction as the first-mentioned half-wave rectifier means, whereby heating current flowing, in use, between the input terminals passes through both conductors in parallel.

9. A heating circuit according to claim 1, wherein said first and second conductors comprise respective conductors of a first heating cable, and the circuit further comprises a second heating cable comprising another said first conductor and second conductor separated by another said separating means, the first conductors of the two cables having different heat outputs, and switch means enabling the circuit to be switched into different configurations whereby different heat outputs can be obtained from the cables and in each of which at least one of the first conductors is connected in series with the half-wave rectifier means and the circuit interruption means between the input terminals and the impedance of at least one of the separating means is connected in series with said resistor between the input terminals.

10. A heating circuit according to claim 9, wherein the switch means is capable of switching the circuit into two configurations in each of which heating current flowing, in use, between the input terminals passes through the first conductor of one only of the cables.

11. A heating circuit according to claim 9, wherein the switch means is capable of switching the circuit into a configuration in which heating current flowing, in use, between the input terminals passes through the first conductors of both cables in series.

12. A heating circuit according to claim 9, wherein the switch means is capable of switching the circuit into a configuration in which heating current flowing, in use, between the input terminals passes through the first conductors of both cables in parallel.

13. A heating circuit according to claim 1, wherein the half-wave rectifier means comprises at least one diode.

14. A heating circuit according to claim 1, wherein the half-wave rectifier means comprises a controlled half-wave rectifier means whereby the heat output of the circuit can be controlled.

15. In a heating circuit comprising input terminals for connection to an AC supply, a first elongate conductor to effect heating, thermally-operative circuit interruption means, the first conductor and circuit interruption means being connected in series between the input terminals, a second elongate conductor substantially coextensive with the first conductor, and separating means which separates the two conductors and which will melt in the event of overheating to allow contact between the two conductors, the improvement comprising a resistor, means electrically connecting the resistor between the second conductor and one of said input terminals such that the resistor and the impedance of the separating means are connected in series between the input terminals, and half-wave rectifier means connected in series with the first conductor and the circuit interruption means between the first conductor and said one input terminal so that during those half-cycles of the AC supply during which the rectifier means does not conduct the second and first conductors are at the potentials of said one input terminal and the other input terminal, respectively, the resistor being thermally coupled to the circuit interruption means whereby in the event of overheating of the separating means causing contact between the first and second conductors anywhere along the length of the separating means the consequent drop in said impedance to substantially zero will cause the current through the resistor to increase by an amount that will heat the resistor by an amount sufficient to cause the circuit interruption means to disconnect the circuit from the supply.

16. A heating circuit according to claim 15, wherein the separating means comprises polyethylene.

17. A heating circuit according to claim 15, wherein the ends of the second conductor are connected together.

18. A heating circuit according to claim 15, wherein the thermally-operative circuit interruption means is a thermal fuse.

19. A heating circuit according to claim 15, wherein said first and second conductors comprise respective conductors of a unitary heating cable and are each heating conductors having respective different heat outputs, the circuit further comprising switch means enabling the circuit to be switched into different configurations whereby different heat outputs can be obtained from the cable.

20. A heating circuit according to claim 19, wherein the switch means is capable of switching the circuit into two configurations in each of which a respective one of the cable conductors constitutes said first conductor and the other one of the cable conductors constitutes said second conductor, each of said two configurations being such that heating current flowing, in use, between the input terminals passes through said first conductor only.

21. A heating circuit according to claim 19, wherein a further half-wave rectifier means is provided and the switch means is capable of switching the circuit into a configuration in which the first and second conductors are connected in series with the further half-wave rectifier means in series between them and poled in the same direction as the first-mentioned half-wave rectifier means whereby heating current flowing, in use, between the input terminals passes through both conductors in series.

22. A heating circuit according to claim 19, wherein another half-wave rectifier means is provided and the switch means is capable of switching the circuit into a configuration in which the first and second conductors are connected in parallel with one another with said other half-wave rectifier means in series with the second conductor and poled in the same direction as the first-mentioned half-wave rectifier means, whereby heating current flowing, in use, between the input terminals passes through both conductors in parallel.

23. A heating circuit according to claim 15, wherein said first and second conductors comprise respective conductors of a first heating cable, and the circuit further comprises a second heating cable comprising another said first conductor and second conductor separated by another said separating means, the first conductors of the two cables having different heat outputs, and switch means enabling the circuit to be switched into different configurations whereby different heat outputs can be obtained from the cables and in each of which at least one of the first conductors is connected in series with the half-wave rectifier means and the circuit interruption means between the input terminals and the impedance of at least one of the separating means is connected in series with said resistor between the input terminals.

24. A heating circuit according to claim 23, wherein the switch means is capable of switching the circuit into two configurations in each of which heating current flowing, in use, between the input terminals passes through the first conductor of one only of the cables.

25. A heating circuit according to claim 23, wherein the switch means is capable of switching the circuit into a configuration in which heating current flowing, in use, between the input terminals passes through the first conductors of both cables in series.

26. A heating circuit according to claim 23, wherein the switch means is capable of switching the circuit into a configuration in which heating current flowing, in use, between the input terminals passes through the first conductors of both cables in parallel.

27. A heating circuit according to claim 15, wherein the half-wave rectifier means comprises at least one diode.

28. A heating circuit according to claim 15, wherein the half-wave rectifier means comprises a controlled half-wave rectifier means whereby the heat output of the circuit can be controlled.

* * * * *